(No Model.)

J. T. CARLEY.
EGG BEATER.

No. 267,491. Patented Nov. 14, 1882.

Witnesses:
John A. Ellis.
C. F. La Mont

Inventor:
James T. Carley
By Laird A. Burr
Attorney.

UNITED STATES PATENT OFFICE.

JAMES T. CARLEY, OF GREENPORT, NEW YORK.

EGG-BEATER.

SPECIFICATION forming part of Letters Patent No. 267,491, dated November 14, 1882.

Application filed October 6, 1882. (No model.)

*To all whom it may concern:*

Be it known that I, JAMES T. CARLEY, of Greenport, in the county of Suffolk and State of New York, have invented a new and useful Improvement in Egg-Beaters; and I do hereby declare that the following is a full and exact description thereof, reference being had to the accompanying drawings, and to the letters of reference marked thereon, making a part of this specification.

My invention relates to an improvement in that class of rotating egg-beaters in which two sets of stirrers or beaters are made to revolve in opposite directions by the movement of a crank actuating suitable gear-wheels.

It has for its object a more perfect division, agitation, and aeration of the egg mass, and the production of a circulation therein from the bottom of the mass upward to prevent the deposit and concentration of sugar or other solid particles under the lower end of the beater.

It consists of a conical frame composed of a series of flat strips or blades radiating from a central collar, to form the base of the cone, and bent back diagonally to reach a tubular spindle at its apex, each blade being twisted in its length, so that the flat surface both of its horizontal arm and of its diagonal arm shall be inclined, the one to the plane of the base of the cone and the other to its sides, in manner to diverge from each other in the direction toward which they revolve; and in the combination, with this conical frame, of a wheel placed beneath it, rotating in an opposite direction in a plane at right angles to the axis of the frame, said wheel being composed of a series of radial blades set at such an angle to the plane in which they revolve as to force upward the liquid mass through which the wheel is rotated.

Figure 1:
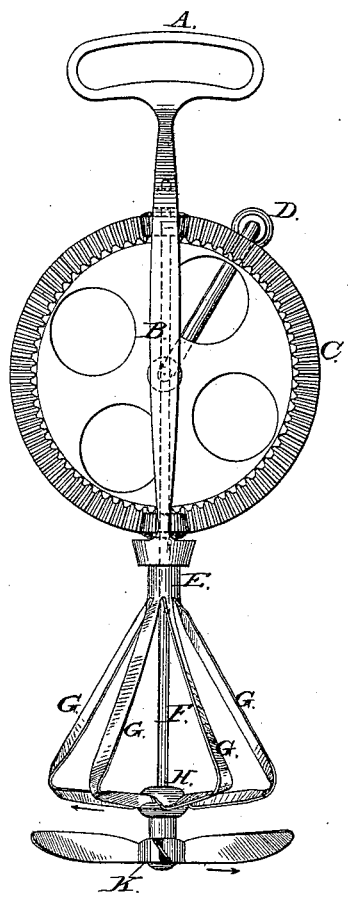
Figure 2:
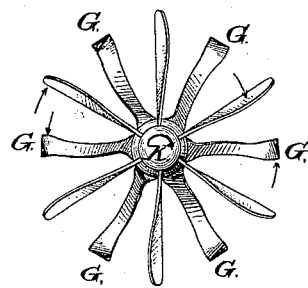

In the accompanying drawings, Figure 1 is an elevation of my improved rotating egg-beater, and Fig. 2 a bottom view thereof.

A is the handle, and B the frame connected with the handle, within which rotates the gear-wheel C, actuated by the crank D. This gear-wheel meshes with a pinion upon a tubular spindle, E, which extends through the lower cross-bar of the frame B, and with a corresponding pinion upon the end of a shaft, F, which extends from a bearing in the upper cross-bar of the frame down through the tubular spindle E in the lower cross-bar.

A form of gearing substantially as above described has heretofore been used for the purpose of obtaining a revolution in opposite directions of a spindle, E, and shaft F; and my invention relates to the combination therewith of an improved form of beaters and stirrers.

G G G are a series of thin flat strips or blades, secured at one end to the tubular spindle E and at the other to a collar, H, fitted to turn loosely upon the shaft F, which projects through and rotates within said spindle. These strips are made to extend out radially from the collar in a plane at right angles to the shaft F, and are bent back, each at an equal distance therefrom, to extend diagonally to the tubular spindle E, thus forming in effect a conical open rotating frame, with the collar H at the center of its base and the spindle E at its apex as its journal-bearings. Each strip is bent or twisted in the direction of its length, so that its radial arm shall be inclined at an angle to the base and its diagonal arm to the side of the cone, in such direction as that the surfaces of the two arms shall lie in planes diverging in the direction toward which they are made to revolve in the normal operation of the device.

Upon the end of the shaft F, immediately below the collar H, a propeller or fan wheel, K, is secured, whose radial blades, extending out as far as do the radial arms of the strips G, are set at a pitch or inclination which will, in the proper operation of the device, operate to lift upward toward the blades G the mass through which the wheel is revolved. The set or inclination of the blades of the wheel K, in connection with the set or inclination of the strips G G of the conical frame revolving in an opposite direction over the wheel, tends to force upward the fluid mass from the bottom of the vessel in which the device is made to rotate, and in its upward flow it is caught by the converging blades of the strips as they travel athwart the current. The result is, that the viscid mass is cut and divided, as well as thoroughly and violently agitated, and a more effective operation is produced, the eggs are more thoroughly and rapidly beaten, and the sugar and other ingredients added thereto are more completely admixed therewith than by any of the devices now in use for the purpose.

I claim as my invention—

The combination, in an egg-beater, with the gearing for actuating the same, of a rotating conical beater-frame constructed of the flat strips G G, each bent at an angle to present two surfaces in its length, which said surfaces are inclined in planes diverging in the direction in which the frame rotates, and a propeller-wheel, K, rotating in an opposite direction beneath said frame, and fitted with blades inclined to force upward the fluid egg to be beaten, substantially in the manner and for the purpose herein set forth.

In testimony whereof I have signed my name to this specification in the presence of two subscribing witnesses.

JAMES T. CARLEY.

Witnesses:
  ORIN F. BROWN,
  W. J. SHERWOOD.